US008171480B2

(12) United States Patent
Petruncola et al.

(10) Patent No.: US 8,171,480 B2
(45) Date of Patent: May 1, 2012

(54) METHOD AND APPARATUS FOR ALLOCATING SHARED RESOURCES TO PROCESS DOMAINS ACCORDING TO CURRENT PROCESSOR UTILIZATION IN A SHARED RESOURCE PROCESSOR

(75) Inventors: Alexander D. Petruncola, San Jose, CA (US); Nareshkumar M. Patel, San Jose, CA (US); Grace Ho, Sunnyvale, CA (US); Jeffrey S. Kimmel, Chapel Hill, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1527 days.

(21) Appl. No.: 10/829,718

(22) Filed: Apr. 21, 2004

(65) Prior Publication Data

US 2005/0172293 A1 Aug. 4, 2005

Related U.S. Application Data

(60) Provisional application No. 60/539,891, filed on Jan. 27, 2004.

(51) Int. Cl.
*G06F 9/46* (2006.01)
(52) U.S. Cl. ........................................ 718/104
(58) Field of Classification Search .......... 718/104–105, 718/102; 712/227
See application file for complete search history.

(56) References Cited

U.S. PATENT DOCUMENTS

| 4,333,144 | A | 6/1982 | Whiteside et al. |
| 4,459,664 | A | 7/1984 | Pottier et al. |
| 4,488,231 | A | 12/1984 | Yu et al. |
| 4,494,188 | A | 1/1985 | Nakane et al. |
| 4,742,447 | A | 5/1988 | Duvall et al. |
| 4,742,450 | A | 5/1988 | Duvall et al. |
| 4,785,392 | A * | 11/1988 | Maier et al. ............. 712/227 |
| 4,875,159 | A | 10/1989 | Cary et al. |
| 4,914,583 | A | 4/1990 | Weisshaar et al. |
| 5,043,873 | A | 8/1991 | Muramatsu et al. |
| 5,253,359 | A | 10/1993 | Spix et al. |
| 5,280,614 | A | 1/1994 | Munroe et al. |
| 5,297,265 | A | 3/1994 | Frank et al. |

(Continued)

FOREIGN PATENT DOCUMENTS

DE 69425658 T2 4/2001

(Continued)

OTHER PUBLICATIONS

Feitelson, Dror G. et al., "Parallel Job Scheduling: Issues and Approaches," Lecture Notes in Computer Science, vol. 949, Proceedings of the Workshop on Job Scheduling Strategies for Parallel Processing, 1995, pp. 1-18.

(Continued)

*Primary Examiner* — Meng An
*Assistant Examiner* — Eric Wai
(74) *Attorney, Agent, or Firm* — Blakely, Sokoloff, Taylor & Zafman LLP.

(57) ABSTRACT

In a processing system which includes a physical processor that includes multiple logical processors, multiple domains are defined for multiple processes that can execute on the physical processor. Each of the processes is assigned to one of the domains. Processor utilization associated with the logical processors is measured, and each of the domains is allocated to a subset of the logical processors according to the processor utilization.

31 Claims, 7 Drawing Sheets

U.S. PATENT DOCUMENTS

| | | | |
|---|---|---|---|
| 5,307,483 A | 4/1994 | Knipfer et al. | |
| 5,327,556 A | 7/1994 | Mohan et al. | |
| 5,357,612 A | 10/1994 | Alaiwan | |
| 5,454,095 A | 9/1995 | Kraemer et al. | |
| 5,481,706 A | 1/1996 | Peek | |
| 5,481,747 A | 1/1996 | Kametani | |
| 5,483,641 A | 1/1996 | Jones et al. | |
| 5,502,840 A | 3/1996 | Barton | |
| 5,513,314 A | 4/1996 | Kandasamy et al. | |
| 5,590,326 A | 12/1996 | Manabe | |
| 5,644,709 A | 7/1997 | Austin | |
| 5,745,778 A * | 4/1998 | Alfieri | 712/1 |
| 5,790,851 A | 8/1998 | Frank et al. | |
| 5,815,727 A | 9/1998 | Motomura | |
| 5,826,081 A | 10/1998 | Zolnowsky | |
| 5,857,180 A | 1/1999 | Hallmark et al. | |
| 5,872,909 A | 2/1999 | Wilner et al. | |
| 5,894,555 A | 4/1999 | Harada et al. | |
| 5,931,938 A | 8/1999 | Drogichen et al. | |
| 5,940,828 A | 8/1999 | Anaya et al. | |
| 5,963,962 A | 10/1999 | Hitz et al. | |
| 6,105,053 A | 8/2000 | Kimmel et al. | |
| 6,151,618 A | 11/2000 | Wahbe et al. | |
| 6,269,390 B1 | 7/2001 | Boland | |
| 6,289,369 B1 | 9/2001 | Sundaresan | |
| 6,345,240 B1 | 2/2002 | Havens | |
| 6,366,945 B1 | 4/2002 | Fong et al. | |
| 6,378,066 B1 | 4/2002 | Lewis | |
| 6,434,631 B1 | 8/2002 | Bruno et al. | |
| 6,470,375 B1 | 10/2002 | Whitner et al. | |
| 6,502,122 B1 | 12/2002 | Takeuchi | |
| 6,546,546 B1 | 4/2003 | Van Doorn | |
| 6,604,123 B1 | 8/2003 | Bruno et al. | |
| 6,622,155 B1 | 9/2003 | Haddon et al. | |
| 6,658,449 B1 | 12/2003 | Brenner et al. | |
| 6,662,252 B1 | 12/2003 | Marshall et al. | |
| 6,691,166 B1 | 2/2004 | Gasior et al. | |
| 6,714,960 B1 | 3/2004 | Bitar et al. | |
| 6,728,959 B1 | 4/2004 | Merkey | |
| 6,745,222 B1 | 6/2004 | Regehr et al. | |
| 6,779,182 B1 | 8/2004 | Zolnowsky | |
| 6,801,943 B1 | 10/2004 | Pavan et al. | |
| 6,850,947 B1 | 2/2005 | Lim et al. | |
| 7,178,137 B1 | 2/2007 | Peak et al. | |
| 7,213,247 B1 | 5/2007 | Wilner et | |
| 7,290,260 B2 * | 10/2007 | Miller | 718/104 |
| 7,337,442 B2 * | 2/2008 | VoBa et al. | 718/102 |
| 7,404,067 B2 | 7/2008 | Aamodt et al. | |
| 7,694,302 B1 | 4/2010 | Rajan et al. | |
| 2001/0036181 A1 | 11/2001 | Rogers | |
| 2001/0037408 A1 | 11/2001 | Thrift et al. | |
| 2001/0037450 A1 | 11/2001 | Metlitski et al. | |
| 2001/0042139 A1 | 11/2001 | Jeffords et al. | |
| 2002/0026342 A1 | 2/2002 | Lane et al. | |
| 2002/0078119 A1 | 6/2002 | Brenner et al. | |
| 2002/0091748 A1 | 7/2002 | Rehg et al. | |
| 2004/0117531 A1 | 6/2004 | McKenney | |

FOREIGN PATENT DOCUMENTS

| | | |
|---|---|---|
| EP | 145889 A2 | 6/1985 |
| EP | 0702815 B1 | 8/2000 |
| JP | 2001 167060 A | 6/2001 |
| WO | WO 94/29807 A1 | 12/1994 |
| WO | WO 02/12839 A2 | 2/2002 |

OTHER PUBLICATIONS

Powell Michael L. et al., "Process Migration in DEMOS/MP," ACM SIGOPS Operating Systems Review, vol. 17, No. 5, Oct. 1983, pp. 110-119.

Michael A. Malcolm; A Process Abstraction and its Application; Department of Computer Science; University of Waterloo; Waterloo, Ontario; Proc. Eighth Manitoba Conference on Numerical Math. and Computing, 1978; pp. 33-50.

Dianne E. Britton and Mark E. Stickel; An Interprocess Communication Facility for Distributed Applications; RCE Laboratories; David Sarnoff Research Center; Princeton, New Jersey; IEEE 1980; pp. 590-595.

David R. Cheriton; Multi-Process Structuring and the Thoth Operating System; Development of Computer Science; University of British Columbia, Vancouver, B.C. Canada; Mar. 1979, pp. 1-64.

Keith A. Lantz et al.; Rochester's Intelligent Gateway; IEEE; Oct. 1982.

Slashdot: Tux2: The Filesystem That Would Be King--Microsoft in Internet Explorer. Oct. 20, 2000.

Anita K. Jones et al.; StarOS, a Multiprocessor Operating System for the Support of Task Forces; Department of Computer Science Carnegie-Mellon University, Pittsburg, Pennsylvania; 1979.

Bruce Nelson and Yu-Ping Cheng; The Myth of Transfer Rate-How and Why SCSI Is Better than IPI for NFS; Technical Report 6, Second Edition-Auspex; Jul. 1992.

David R. Cheriton; The Thoth System: Multi-Process Structuring and Portablility; Operating and Programming Systems Series; The Computer Science Library, 1982.

David R. Cheriton et al.; Thoth, A Portable Real-Time Operating System; vol. 22; Feb. 1979; pp. 105-115. Operations Systems, Communications of the ACM, University of Waterloo.

Intel Corporation, *IA-32 Intel Architecture Software Developer's Manual*, vol. 3: System Programming Guide, pp. 7-21-7-46, Denver, Colorado, 2004.

Jin Xiong et al: "Design and performance of the dawning cluster file system" Cluster Computing, 2003. Proceedings. 2003 IEEE International Conference on Dec. 1-4, 2003, Piscataway, NJ, USA, IEEE, Dec. 1, 2003, pp. 232-239.

Joukov N et al. "Increased distributed storage survivability with a stackable raid-like file system" Cluster Computing and the Grid, 2005. CCGRID 2005. IEEE International Symposium on Cardiff, Wales, UK May 9-12, 2005, Piscataway, NJ, USA, IEEE, May 9, 2005, pp. 82-89.

* cited by examiner

METHOD AND APPARATUS FOR ALLOCATING SHARED RESOURCES TO PROCESS DOMAINS ACCORDING TO CURRENT PROCESSOR UTILIZATION IN A SHARED RESOURCE PROCESSOR

This application claims the benefit of U.S. provisional patent application No. 60/539,891 of A. Petruncola et al., filed on Jan. 27, 2004 and entitled, "Scheduling Algorithm for Shared Resource CPUs," which is incorporated herein by reference.

FIELD OF THE INVENTION

At least one embodiment of the present invention pertains to processors which implement hyper-threading, and more particularly, to a scheduling algorithm to allocate processor resources in processors which implement hyper-threading.

BACKGROUND

Figure 1:
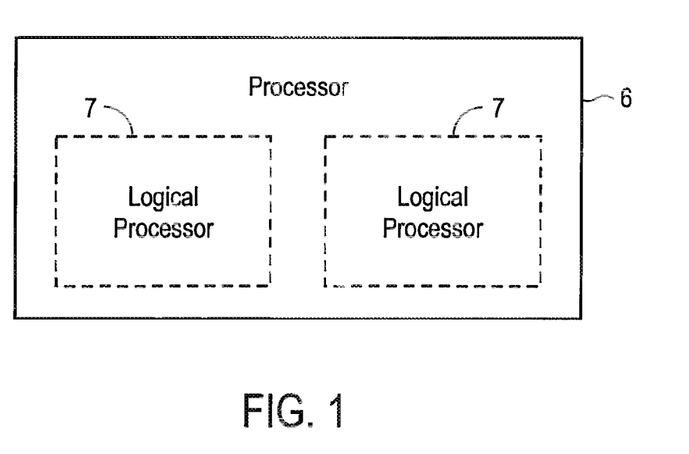
FIG. 1 illustrates a physical processor that includes multiple logical processors.

Some processors used in modern computer systems support a technology called hyper-threading. Hyper-threading enables a single physical processor to appear as multiple logical processors. This principle is illustrated in FIG. 1, in which one physical processor 6 includes two logical processors 7. Hyper-threading, therefore, allows a single physical processor to execute multiple code streams concurrently. The logical processors have some private state, but a portion of the state is shared. Current hyper-threading implementations support two logical processors, with the logical processors sharing the execution engine and the system bus interface. Each logical processor has some unique resources, such as general purpose registers, program counter and local Advanced Programmable Interrupt Controller (APIC) registers.

When hyper-threading is used in a processing system, some technique is required to schedule (allocate) the various processes in the processing system among the logical processors. A simple approach to using hyper-threading technology is to treat the logical processors as if they are physically separate processors. For example, this approach might involve scheduling processes across all logical processors as if they were physically independent processors. This works from a functional viewpoint, but since certain resources are shared, these processors can interfere with each other in terms of performance.

SUMMARY OF THE INVENTION

The present invention includes a method and a corresponding apparatus in which multiple domains are defined for multiple processes that can execute on a physical processor in a processing system. The physical processor includes multiple logical processors. Processor utilization in the processing system is measured, and each of the domains is allocated to a subset of the logical processors according to the processor utilization.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for allocating resources in a shared resource processor are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Figure 2:
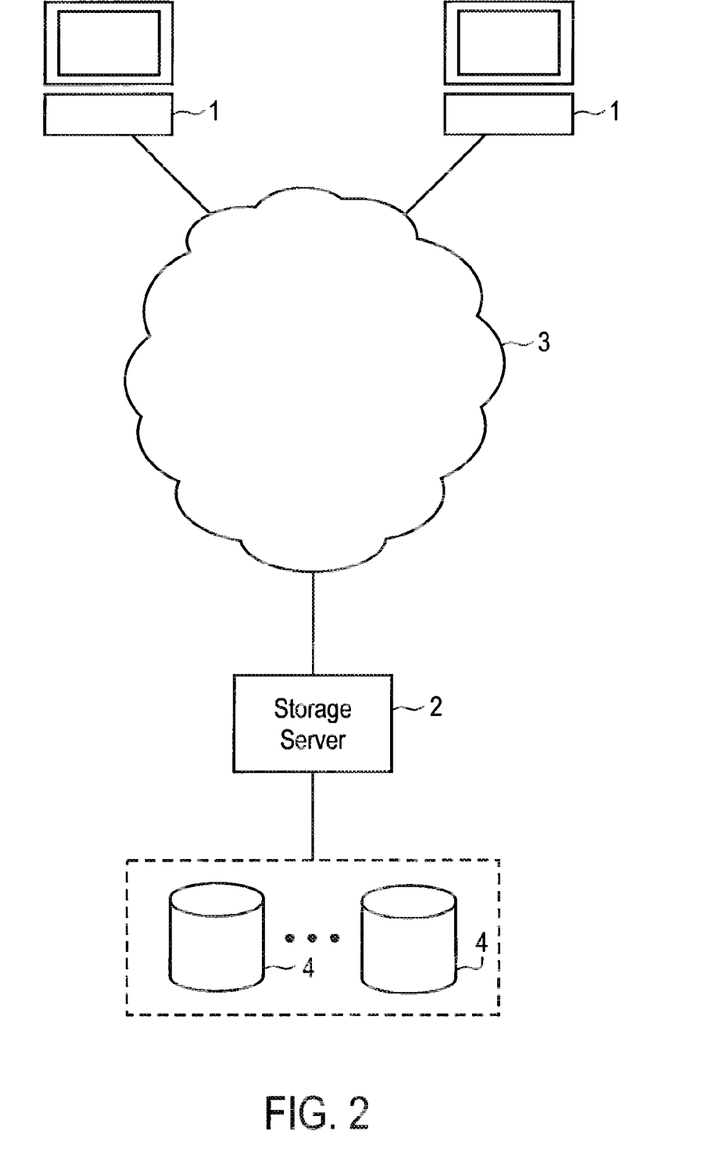
FIG. 2 illustrates a network environment in which the invention can be implemented.

FIG. 2 illustrates an example of a network environment in which the invention can be implemented. Although the example of FIG. 2 is a networked storage system, it will be understood that the invention can also be implemented in any of various other types of environments, not necessarily a storage system. The system of FIG. 2 includes a storage server 2 coupled locally to a set of mass storage devices 4, and to a set of clients 1 through an interconnect 3. A resource allocation/scheduling algorithm in accordance with the invention can be implemented in the storage server 2, as described further below. The storage server 2 may be, for example, a file server, or "filer". The storage server 2 receives various read and write requests from the clients 1 and accesses the mass storage devices 4 to service those requests. Each of the clients 1 may be, for example, a conventional personal computer (PC), workstation, or the like. The mass storage devices 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The mass storage devices 4 may be organized into one or more volumes of Redundant Array of Independent Disks (RAID).

In certain embodiments, the storage server 2 is capable of operating in either a network attached storage (NAS) mode or in a storage area network (SAN) mode, or both; that is, the storage server to can provide file-level access or block-level access to stored data. The storage server 2 can implement one or more of various different storage protocols, such as the common Internet file system (CIFS), network file system (NFS), hypertext transport protocol (HTTP), simple network management protocol (SNMP), etc., and can selectively use these protocols as needed.

In a NAS implementation, the interconnect 3 may be essentially any type of computer network, such as a local area network (LAN), a wide area network (WAN), metropolitan area network (MAN) or the Internet, and may implement the Internet Protocol (IP). In a SAN implementation, the interconnect 3 may be, for example, a Fibre Channel switching fabric which implements the Fibre Channel Protocol (FCP).

Figure 3:
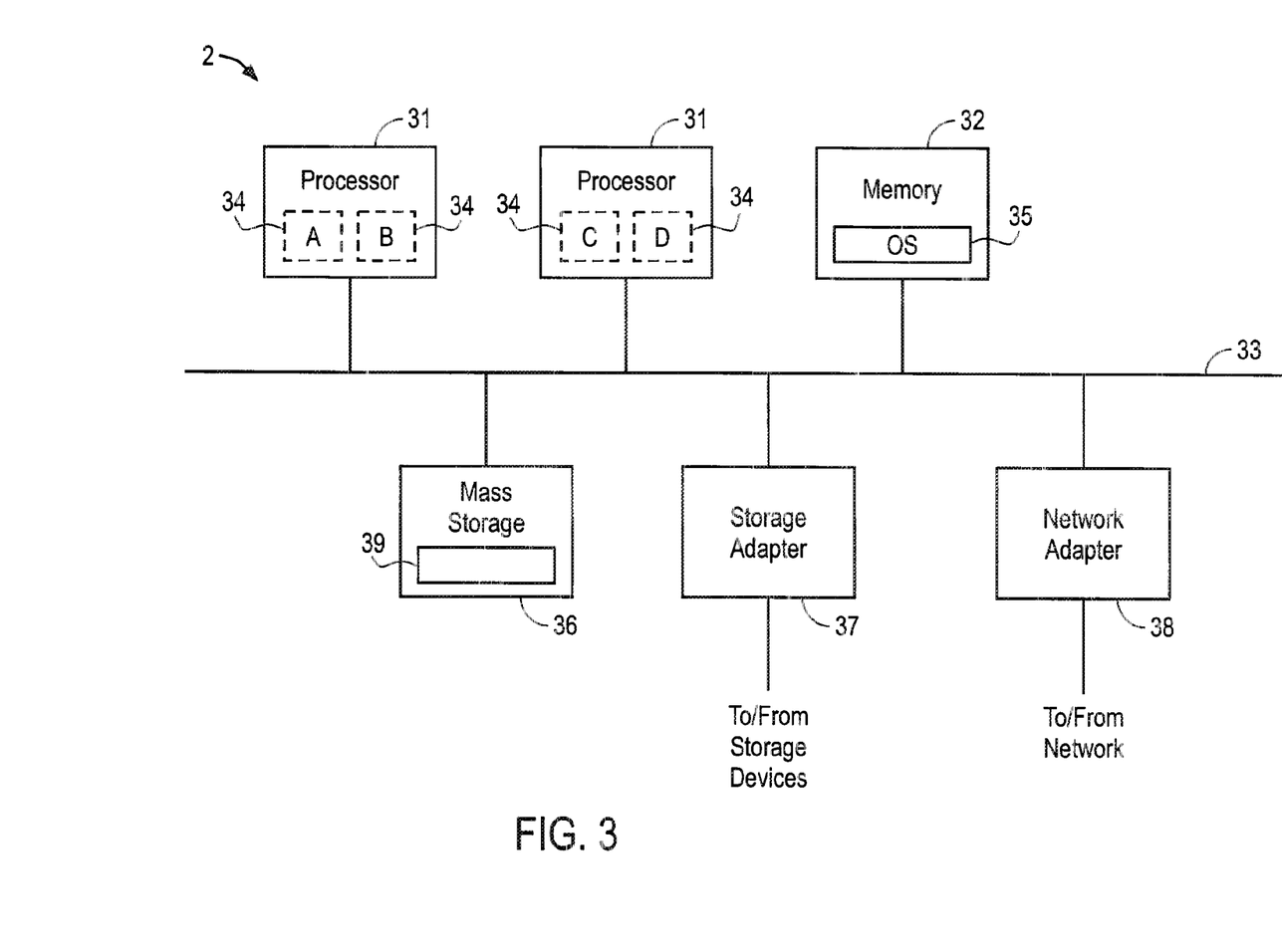
FIG. 3 is a block diagram of the storage server of FIG. 2 according to embodiments of the invention.

FIG. 3 is a block diagram of the storage server 2 of FIG. 2, according to embodiments of the invention. Certain standard and well-known components which are not germane to the present invention may not be shown. The storage server 2 is a multi-processor system, in that it includes two physical processors 31 coupled to a bus system 33. Each of the physical processors 31 supports hyper-threading technology, in that each of them includes two logical processors 34. One physical processor 31 includes logical processors A and B, while the other physical processor includes logical processors C and D. Note that in other embodiments the storage server 2 may include a number of physical processors other than two, and/or each physical processor may include a number of logical processors other than two.

The bus system 33 is an abstraction that represents any one or more separate physical buses and/or point-to-point connections, connected by appropriate bridges, adapters and/or controllers. The bus system 33, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The physical processors 31 are the central processing units (CPUs) of the storage server 2 and, thus, control the overall operation of the storage server 2. In certain embodiments, the physical processors 31 accomplish this by executing software stored in memory 32. A physical processor 31 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The storage server 2 also includes memory 32 coupled to the bus system 43. The memory 32 represents any form of random access memory (RAM), read-only memory (ROM), flash memory, or a combination thereof. Memory 32 stores, among other things, the operating system 35 of the storage server 2, in which the techniques introduced herein can be implemented.

Also connected to the processors 31 through the bus system 33 are a mass storage device 36, a storage adapter 37, a network adapter 38. Mass storage device 36 may be or include any conventional medium for storing large volumes of data in a non-volatile manner, such as one or more disks. The storage adapter 37 allows the storage server 2 to access the external mass storage devices 4 and may be, for example, a Fibre Channel adapter or a SCSI adapter. The network adapter 38 provides the storage server 2 with the ability to communicate with remote devices such as the clients 1 over a network and may be, for example, an Ethernet adapter.

Memory 32 and mass storage device 36 store software instructions and/or data 35 and 39, which may include instructions and/or data used to implement the scheduling algorithm introduced herein. These instructions and/or data may be implemented as part of the operating system 35 of the storage server 2.

Figure 4:
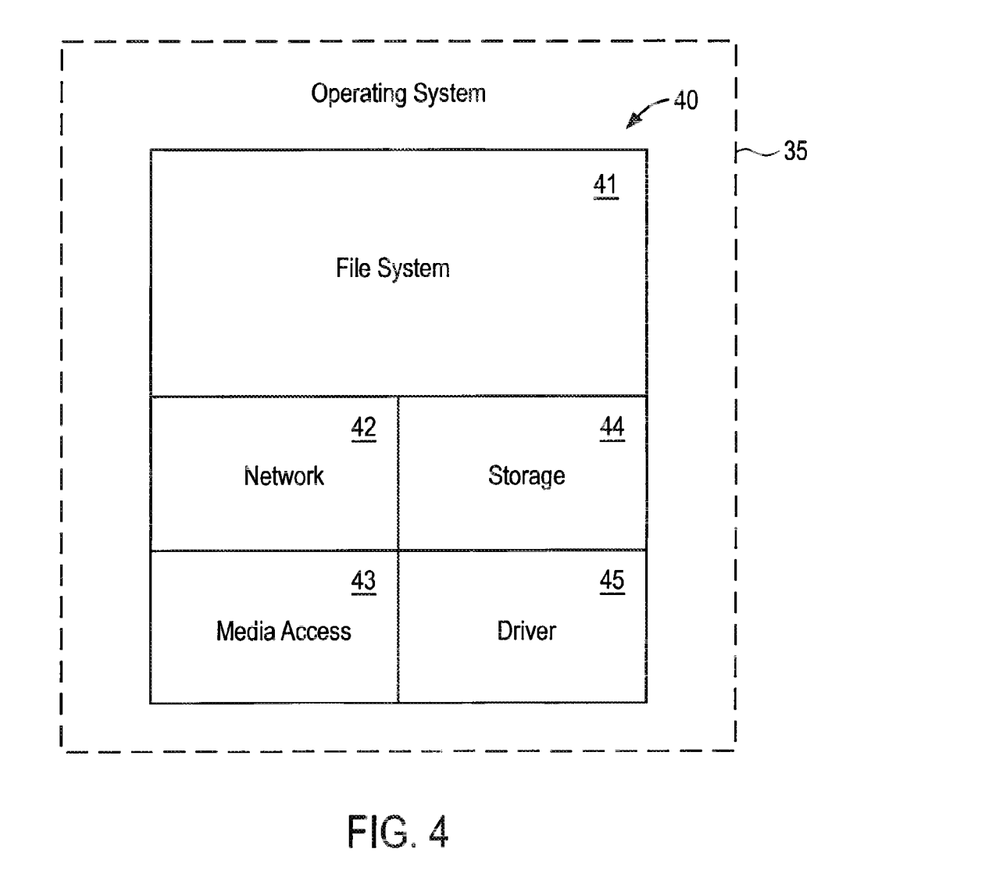
FIG. 4 illustrates the kernel of the operating system of the storage server according to embodiments of the invention.

A shown in FIG. 4, the operating system 35 of the storage server 2 has a kernel 40 which includes several modules, or layers. These layers include a file system 41, which executes read and write operations on the mass storage devices 4 in response to client requests, maintains directories of stored data, etc. Under (logically) the file system 41, the kernel 40 also includes a network layer 42 and an associated media access layer 43 to allow the storage server to communicate over a network (e.g., with clients 1). The network access 42 layer may implement any of various protocols, such as NFS, CIFS and/or HTTP. The media access layer 43 includes one or more drivers which implement one or more protocols to communicate over the network, such as Ethernet. Also logically under the file system 41, the kernel 40 includes a storage access layer 44 and an associated driver layer 45 to allow the storage server 2 to communicate with external mass storage devices 4. The storage access layer 44 implements a disk storage protocol such as RAID, while the driver layer 45 implements a lower-level storage device access protocol, such as Fibre Channel or SCSI. The details of the above-mentioned layers of the kernel 40 are not necessary for an understanding of the invention and, hence, need not be described herein.

Figure 5:
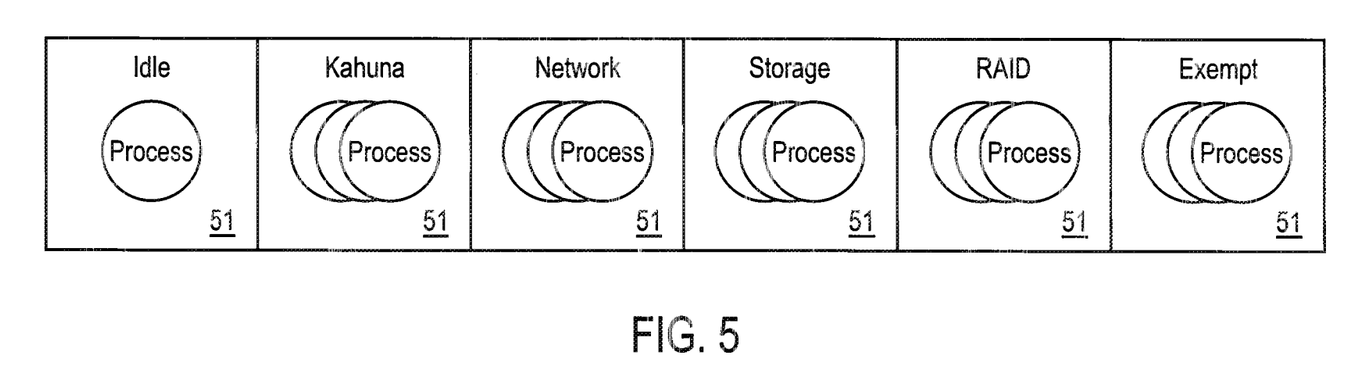
FIG. 5 shows multiple domains that may be implemented in the storage server according to embodiments of the invention.

In certain embodiments of the invention, to ensure that instructions and data are safe for execution in a multi-processor environment, the operating system 35 of the storage server 2 implements very coarse-grained symmetric multiprocessing (CSMP) instead of fine-grained symmetric multiprocessing found on some other systems, typically implemented by explicit locking mechanisms. Hence, in such embodiments the various processes implemented by the operating system 35 are organized into a number of mutual exclusion "domains" 51 according to their functionality, as shown in FIG. 5 according to one embodiment. A domain 51, in this context, is a grouping of processes. Every process capable of execution by the storage server 2 is assigned to one specific domain 51. The domains 51 are defined according to functionality so that it is not possible for two processes in different domains to operate on the same data simultaneously. Furthermore, only one process at a time can execute in each domain 51, with certain exceptions noted below. Further details of a technique for defining and using domains in this manner are described in co-pending U.S. patent application Ser. No. 09/828,271 of V. Rajan et al, filed on Apr. 5, 2001 and entitled, "Symmetric Multi-Processor Synchronization using Migrating Scheduling Domains", and U.S. patent application Ser. No. 09/828,284 of C. Peak et al., filed on Apr. 5, 2001 and entitled, "Automatic Verification of Scheduling Domain Consistency," both of which are incorporated herein by reference.

In certain embodiments of the invention, as illustrated in FIG. 5, the following six domains 51 are implemented in the storage server 2: Idle, Kahuna, Network, Storage, RAID, and Exempt. The Network domain essentially includes all network-specific processes of the storage server 2. The Storage domain includes all storage-specific processes of the storage server 2. The RAID domain essentially includes all RAID-specific processes of the storage server 2. The Kahuna domain essentially includes the file system processes and all other processes that do not belong to another domain based on their functionality. A scheduler algorithm in the operating system 35 allows only one process to execute at a time in each domain 51, with two exceptions: the Idle domain and the Exempt Domain. The Idle domain is the domain within which a processor executes the idle loop. Idle threads from multiple processors may execute simultaneously in the Idle domain. The Exempt domain includes certain processes that are inherently multi-processor safe (such as RAID XOR computations, compression/decompression, etc.) due to their inherently low risk of corrupt or lost data.

It has been observed by the inventors of the present application that there are instances where using hyper-threading can cause a decrease in performance of a storage server such as storage server 2. For example, in certain cases using hyper-threading with a conventional scheduling algorithm, only about half the maximum possible processor utilization is achieved. The maximum theoretically possible processor utilization is n×100%, where n is the number of logical processors in the system (e.g., 400% in a system with two physical processors, each implementing two logical processors). Another observation is that domain utilizations vary depending upon workload. There is a need, therefore, for an algorithm which adapts to changing workload conditions in an hyper-threading-enabled processor and which does not necessarily utilize all of the logical processors.

Figure 6:
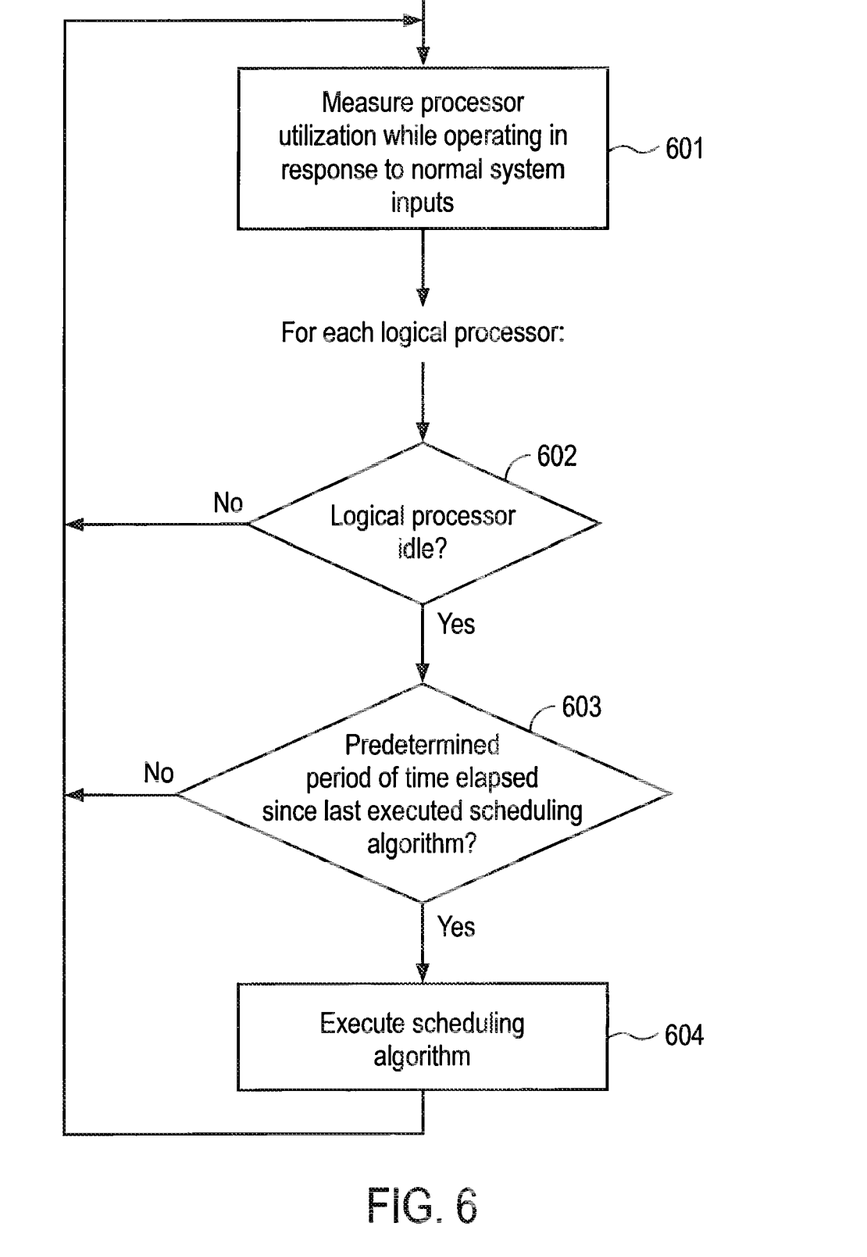
FIG. 6 is a flow diagram of a process that may be performed in the storage server according to embodiments of the invention.

Therefore, in accordance with certain embodiments of the invention, processor utilization in the storage server 2 is measured, and each of the domains 51 is allocated to a particular subset of the logical processors 34 (i.e., to one or more particular logical processors) based on the processor utilization, as described further below. FIG. 6 is a flow diagram of a process that may be performed in the storage server 2 according to embodiments of the invention.

Initially, (block 601) processor utilization is measured for all four logical processors while the storage server 2 operates in response to normal system inputs. It is assumed that the operating system 35 of the storage server 2 includes an algorithm that is able to collect processor utilization data in raw form, determine utilization required by each domain, and express the total utilization in terms of percent utilization. The remaining operations in FIG. 6 are performed for each logical processor 34: When a logical processor 34 enters its idle loop (block 602), if a predetermined period of time has elapsed since the last time the scheduling algorithm was invoked (1 second, for example) (block 603), then the scheduling algorithm introduced herein (described further below) is invoked (block 604). In order to have minimal overhead, in certain embodiments the scheduling algorithm is invoked once per second by any logical processor 34 entering the idle loop, so processor cycles which are "free" are used.

Figure 7:
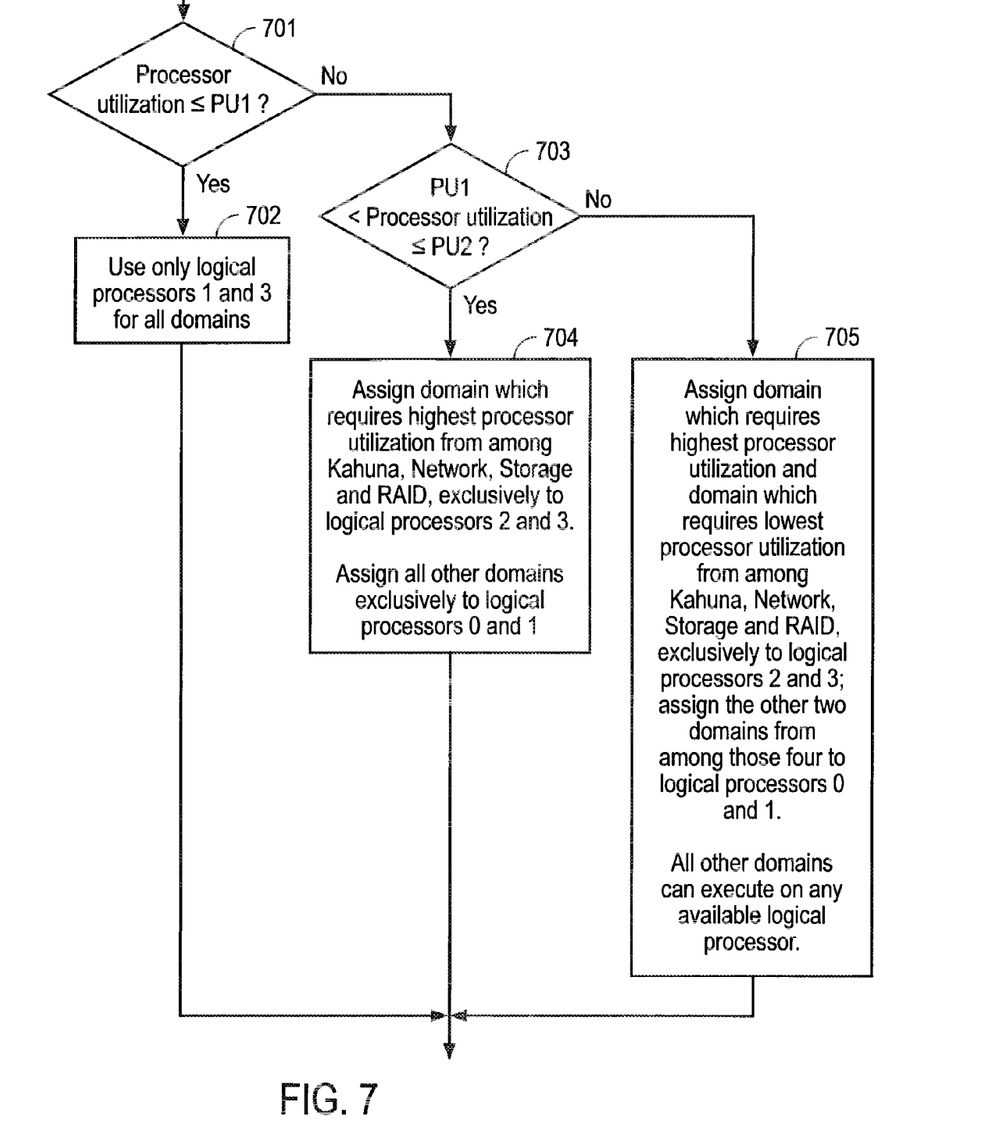
FIG. 7 is a flow diagram of a scheduling algorithm that may be performed in the storage server according to embodiments of the invention.

FIG. 7 is a flow diagram of the scheduling algorithm according to certain embodiments of the invention. The scheduling algorithm has different modes of operation, where the mode used at any given time depends on processor utilization. If (block 701) the total processor utilization for the storage server 2 during the previous second was less than or equal to a first predetermined processor utilization level, PU1, then the scheduler uses two logical processors (block 702) for all domains. In one embodiment the two processors will be logical processors B and D (see FIG. 3). Input/output (I/O) interrupts are serviced by logical processor A, so this still provides some benefit to the execution, since interrupt processing will not affect process execution.

Otherwise, if (block 703) the total processor utilization during the last second was greater than PU1 but less than or equal to a second predetermined processor utilization level, PU2, then the domain with the highest processor utilization of Kahuna, Network, Storage, and RAID is identified and assigned exclusively to logical processors C and D (block 704). No other domain will execute on those logical processors; all other domains will execute instead on logical processors A and B. The purpose is to move the highest utilization domain to its own physical processor so that it can always execute and also has cache affinity. The remaining code still has two logical processors upon which to execute, just as in the non-hyper-threading case.

If total measured processor utilization is greater than PU2, then the domains with the highest and lowest processor utilization from the above mentioned four domains (Kahuna, Network, Storage, and RAID) are identified and restricted to logical processors C and D, while the other two domains from those four are restricted to logical processors A and B (block 705). All other domains, such as the Exempt domain, will execute on any available logical processor.

An additional modification can be made to the scheduler algorithm described above to handle possible workloads where the exempt domain is the primary domain. For example, if the exempt domain has the maximum processor utilization and requires more than 80% of a processor, then the algorithm can revert to a default scheduling algorithm in which any logical processor can execute any domain. This mode of operation may occur, for example, with heavy use of data compression and would allow the compression code to execute on all processors concurrently.

In certain embodiments of the invention, the first processor utilization level PU1 is 150% and the second processor utilization level PU2 is 220%. Note, however, that these values are only examples, which are not necessarily suitable for all implementations and embodiments of the invention. The optimum values for these levels may vary considerably depending on various factors, such as the particular hardware and software composition of the device in which the algorithm is implemented. The boundaries between the above-mentioned modes of operation are somewhat arbitrary and are chosen to avoid using a logical processor prior to the point at which it can perform useful work. This approach may require modification to suit a particular implementation, but the chosen boundaries are such that the hyper-threading operation did not make much of a difference until the workload approaches the limit.

The processor utilization levels PU1 and PU2 can be set prior to normal operation of the system in the field (e.g., as configuration parameters), based on experimental results. However, these boundary levels between modes may also be automatically modified dynamically during normal operation in the field, by the storage system 2 or by an external device, in response to any of various factors, such as measured system performance, load balancing, changes in the network environment, etc. One or more heuristics can be used to set or modify these levels dynamically.

Note also that the scheduling technique introduced above can also be applied in any of various other types of devices which implement multiple logical processors, not just in a storage server. For example, the technique can also be applied in general-purpose computer systems and any of various other types of special-purpose processing systems.

Thus, a method and apparatus for allocating resources in a shared resource processor have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    defining a plurality of domains, each domain comprising a plurality of processes for execution on one of a plurality of physical processors in a processing system, the physical processors including a plurality of logical processors;

assigning each of the plurality of processes to one of the plurality of domains based on a resource requirement not including processor utilization, wherein each of the plurality of processes comprises an executable code stream and belongs to exactly one domain, and wherein only one process in each domain can execute at a time;

measuring processor utilization in the processing system; and allocating one of the plurality of domains to a subset of the plurality of logical processors according to the processor utilization, wherein said allocating comprises:
 if the processor utilization is within a first range, assigning the plurality of domains exclusively to a first subset of the plurality of logical processors; and
 if the processor utilization is within a second range higher than the first range, assigning one of the domains which requires a highest processor utilization exclusively to a second subset of the plurality of logical processors, wherein each of the logical processors in the second subset is implemented on the same physical processor, and
 excluding each of the other domains from the second subset of logical processors;
 if the processor utilization is within a third range higher than the second range, then
 assigning the one of the domains which requires the highest processor utilization and the one of the domains which requires a lowest processor utilization exclusively to the second subset of the plurality of logical processors, and
 excluding each of the other domains from using the second subset of logical processors.

2. A method as recited in claim 1, wherein each of the domains is defined to include processes that relate to a particular type of functionality.

3. A method as recited in claim 1, wherein the domains are one or more of: an Idle domain, a Network domain, a Storage domain, a RAID domain, an Exempt domain and a Miscellaneous domain.

4. A method as recited in claim 3, wherein the Idle domain is the domain within which a processor executes an idle loop.

5. A method as recited in claim 1, further comprising automatically modifying at least one of the first range, second range and third range dynamically during operation of the processing system.

6. A method as recited in claim 3, wherein the Miscellaneous domain includes file system processes and all other processes not assigned to other domains.

7. A method as recited in claim 1, wherein allocating the domains to at least one subset of the plurality of logical processors according to the processor utilization further comprises:
 if the processor utilization is within the second range higher than the first range, then assigning each of the other domains exclusively to a third subset of the plurality of logical processors, wherein the second subset and the third subset are mutually exclusive.

8. A method as recited in claim 3, wherein the Exempt domain includes multi-processor safe processes.

9. A method as recited in claim 1, wherein allocating the domains to at least one subset of the plurality of logical processors according to the processor utilization further comprises:
 if the processor utilization is within the third range higher than the second range, then assigning each of the other domains exclusively to a third subset of the plurality of logical processors.

10. A method of allocating a plurality of processes to a plurality of logical processors implemented by a plurality of physical processors in a processing system, the method comprising:
 defining a plurality of domains, each domain comprising a one or more of the plurality of processes;
 assigning each of the plurality of processes to one of the plurality of domains based on a resource requirement not including processor utilization, wherein each of the plurality of processes comprises an executable code stream and belongs to exactly one domain, wherein only one process can execute in each domain at a time, wherein each of the domains is defined to include processes that relate to a particular type of functionality;
 determining processor utilization associated with execution of the processes;
 if the processor utilization is within a first range, assigning the plurality of domains exclusively to a first subset of the plurality of logical processors; and
 if the processor utilization is within a second range higher than the first range, assigning the one of the domains which requires a highest processor utilization exclusively to a second subset of the plurality of logical processors, excluding each of the other domains from the second subset of logical processors, wherein each logical processor in second subset of logical processors is implemented on the same physical processor;
 if the processor utilization is within a third range higher than the second range, then assigning the one of the domains which requires the highest processor utilization and the one of the domains which requires a lowest processor utilization exclusively to the second subset of the plurality of logical processors, and excluding each of the other domains from using the second subset of logical processors.

11. A method as recited in claim 10, further comprising, if the processor utilization is within the second range:
 assigning each of the other domains exclusively to a third subset of the plurality of logical processors, wherein the second subset and the third subset are mutually exclusive.

12. A method as recited in claim 10, wherein the domains are one or more of: an Idle domain, a Network domain, a Storage domain, a RAID domain, an Exempt domain and a Miscellaneous domain.

13. A method as recited in claim 10, further comprising, if the processor utilization is within the third range:
 assigning each of the other domains exclusively to the third subset of the plurality of logical processors.

14. A method as recited in claim 10, further comprising automatically modifying at least one of the first range, the second range and the third range dynamically during operation of the processing system.

15. A processing system comprising:
 a plurality of physical processors which includes a plurality of logical processors; and
 a memory storing instructions which when executed cause the processing system to allocate a plurality of processes to the plurality of logical processors, by
 defining a plurality of domains, each domain comprising one or more of the plurality of processes;
 assigning each of the plurality of processes to one of the plurality of domains based on a resource requirement not including processor utilization, wherein each of the plurality of processes comprises an executable code stream and belongs to exactly one domain, wherein each of the domains is defined to include processes that relate to a particular type of functionality;

measuring processor utilization associated with the plurality of logical processors;

allocating the domains according to a first allocation if the processor utilization is within a first range, wherein allocating the domains according to the first allocation comprises assigning the plurality of domains to a first subset of the plurality of logical processors; and allocating the domains according to a second allocation if the processor utilization is within a second range, wherein the second allocation allocates the domain requiring a highest processor utilization exclusively to a second subset of the plurality of logical processors, and wherein each logical processor in the subset is implemented on the same physical processor, and wherein each of the other domains is excluded from the second subset of logical processors;

allocating the domains according to a third allocation if the processor utilization is within a third range, wherein the third range is higher than the first and second ranges, and wherein the third allocation allocates the one of the domains which requires the highest processor utilization and the one of the domains which requires a lowest processor utilization exclusively to the second subset of the plurality of logical processors, and excludes each of the other domains from using the second subset of logical processors.

16. A processing system as recited in claim 15, wherein only one process can execute at a time in each domain.

17. A processing system as recited in claim 15, wherein at least one of the first range, the second range and the third range can be automatically modified dynamically during operation of the processing system.

18. A processing system as recited in claim 15, wherein the domains are one or more of: an Idle domain, a Network domain, a Storage domain, a RAID domain, an Exempt domain and a Miscellaneous domain.

19. A processing system as recited in claim 18, wherein the Idle domain is the domain within which a processor executes an idle loop.

20. A processing system as recited in claim 18, wherein the Exempt domain includes multi-processor safe processes.

21. A processing system as recited in claim 18, wherein the Miscellaneous domain includes file system processes and all other processes not assigned to other domains.

22. A storage server to provide a plurality of clients with access to data stored in a plurality of mass storage devices, the storage server comprising:

a plurality of physical processors which includes a plurality of logical processors;

a storage adapter coupled to the plurality of physical processors, to couple the storage server to the plurality of mass storage devices that store data;

a network adapter coupled to the plurality of physical processors, to couple the storage server to the plurality of clients over a network; and a storage facility coupled to the plurality of physical processors and storing instructions which when executed cause the storage server to perform a process comprising:

defining a plurality of domains, each domain comprising a plurality of processes for execution on one of the plurality of physical processors;

assigning each of the plurality of processes to one of the plurality of domains based on a resource requirement not including processor utilization;

measuring processor utilization associated with the plurality of logical processors;

selecting a subset of the plurality of logical processors based on a distribution of the logical processors among the physical processors, wherein each of the logical processors in the subset are implemented on the same physical processor; and allocating one of the domains to the subset of the plurality of logical processors according to the processor utilization, wherein said allocating comprises:

if a first condition of processor utilization is within a first range, assigning the plurality of domains exclusively to a first subset of the plurality of logical processors; and if a second condition of processor utilization is within a second range higher than the first range, assigning one of the domains which requires a highest processor utilization exclusively to a second subset of the plurality of logical processors, wherein each of the logical processors in the subset is implemented on the same physical processor, and excluding each of the other domains from the second subset of logical processors;

if the processor utilization is within a third range higher than the second range, then assigning the one of the domains which requires the highest processor utilization and the one of the domains which requires the lowest processor utilization exclusively to the second subset of the plurality of logical processors, and excluding each of the other domains from using the second subset of logical processors.

23. A storage server as recited in claim 22, wherein each of the domains is defined to include processes that relate to a particular type of functionality.

24. A storage server as recited in claim 22, wherein allocating each of the domains to a subset of the plurality of logical processors according to the processor utilization comprises:

assigning at least one of the domains to particular subset of the plurality of logical processors according to the processor utilization of said at least one of the domains.

25. A storage server as recited in claim 22, wherein allocating each of the domains to a subset of the plurality of logical processors according to the processor utilization comprises:

allocating the domains according to a first allocation if the processor utilization is within a first range; and allocating the domains according to a second allocation if the processor utilization is within a second range.

26. A storage server as recited in claim 22, wherein the domains are one or more of: an Idle domain, a Network domain, a Storage domain, a RAID domain, an Exempt domain and a Miscellaneous domain.

27. A storage server as recited in claim 22, wherein allocating the domains to at least one subset of the plurality of logical processors according to the processor utilization further comprises:

if the processor utilization is within a second range higher than the first range, then assigning each of the other domains exclusively to a third subset of the plurality of logical processors, wherein the second subset and the third subset are mutually exclusive.

28. A storage server as recited in claim 26, wherein the Miscellaneous domain includes file system processes and all other processes not assigned to other domains.

29. A storage server as recited in claim 22, wherein allocating the domains to at least one subset of the plurality of logical processors according to the processor utilization further comprises:
assigning each of the other domains exclusively to the third subset of the plurality of logical processors.

30. An apparatus comprising:
a physical processor which includes a plurality of logical processors;
means for defining a plurality of domains, each domain comprising a plurality of processes for execution on the physical processor;
means for assigning each of the plurality of processes to one of the plurality of domains based on a resource requirement not including processor utilization, wherein each of the plurality of processes comprises an executable code stream being assigned to exactly one of the domains, and wherein only one process can execute at a time in each domain;
means for measuring processor utilization associated with the plurality of logical processors; and
means for allocating each of the domains to a subset of the plurality of logical processors according to the processor utilization, wherein said allocating comprises:
if processor utilization is within a first range, assigning the plurality of domains to a first subset of the plurality of logical processors;
if processor utilization is within a second range higher than the first range,
assigning one of the domains which requires a highest processor utilization exclusively to a second subset of the plurality of logical processors, wherein each of the logical processors in the subset is implemented on the same physical processor, and
excluding each of the other domains from the second subset of logical processors; and
if the processor utilization is within a third range higher than the second range,
assigning the one of the domains which requires the highest processor utilization and the one of the domains which requires a lowest processor utilization exclusively to the second subset of the plurality of logical processors, and
excluding each of the other domains from using the second subset of logical processors.

31. An apparatus as recited in claim 30, wherein:
the domains are one or more of: an Idle domain, a Network domain, a Storage domain, a RAID domain, an Exempt domain and a Miscellaneous domain.

* * * * *